United States Patent
Szewerenko et al.

(10) Patent No.: US 7,343,591 B2
(45) Date of Patent: Mar. 11, 2008

(54) REAL-TIME DATA EXCHANGE ON DEMAND

(75) Inventors: Leland J. Szewerenko, Pittsburgh, PA (US); Deborah C. Keil, Pittsburgh, PA (US); Craig D. McLean, Irwin, PA (US)

(73) Assignee: Texas Instruments Incorporated, Dallas, TX (US)

( * ) Notice: Subject to any disclaimer, the term of this patent is extended or adjusted under 35 U.S.C. 154(b) by 733 days.

(21) Appl. No.: 10/406,972

(22) Filed: Apr. 4, 2003

(65) Prior Publication Data

US 2004/0024924 A1 Feb. 5, 2004

Related U.S. Application Data

(60) Provisional application No. 60/399,717, filed on Aug. 1, 2002.

(51) Int. Cl.
G06F 9/44 (2006.01)
G06F 11/00 (2006.01)
G06G 9/45 (2006.01)

(52) U.S. Cl. ............... 717/134; 717/127; 717/129; 717/138; 714/27; 714/30

(58) Field of Classification Search ........ 717/124–138, 717/168–178; 703/14–28; 714/27–31
See application file for complete search history.

(56) References Cited

U.S. PATENT DOCUMENTS 5,884,023 A * 3/1999 Swoboda et al. ........... 395/183
6,356,960 B1 * 3/2002 Jones et al. ..................... 710/5
6,543,048 B1 * 4/2003 Kuzemchak et al. ........ 717/127
6,775,793 B2 * 8/2004 Deao et al. .................. 714/29
2003/0074650 A1 * 4/2003 Akgul et al. ................ 717/124
2003/0105620 A1 * 6/2003 Bowen ........................ 703/22

* cited by examiner

Primary Examiner—Meng-Al T. An
Assistant Examiner—Insun Kang
(74) Attorney, Agent, or Firm—W. James Brady, III; Frederick J. Telecky, Jr.

(57) ABSTRACT

A real time data exchange on demand system for transferring real time data between a host processor and a target processor is described. The target processor includes a real time target exchange library and API library interface to a target application. The host processor includes a target server, a real time data exchange API interface to a host data exchange application and a real time data exchange dynamic link library. An interconnection data link is coupled between said real time target exchange library on said target processor and said real time data exchange dynamic link library on said host processor. The host processor includes a user interface for programming real time data exchange transfer points for data exchange into the target processor that are passed down to the target processor via the interconnection data link. The target processor has programmable triggers that are programmed by the transfer points that call an appropriate real time data exchange routine to do the data transfer.

7 Claims, 3 Drawing Sheets

REAL-TIME DATA EXCHANGE ON DEMAND

This application claims priority under 35 U.S.C. § 119(e)(1) of provisional application No. 60/399,717 filed Aug. 1, 2002.

FIELD OF INVENTION

This invention relates to real time data transfer and more particularly to real time data transfer on demand dynamically inserting data transfer points in target application without code modification.

BACKGROUND OF INVENTION

Digital signal processing refers to the electronic processing of signals, or any application that involves rapid numeric processing. The software development for applications on digital signal processors is an iterative process. A compiler translates source code into an assembly language source code. An assembler translates the assembly language source code files into machine language object files. Source files may contain instructions, assembly directives, and macro directives. A linker combines the object files into a single executable object module or program. As the linker creates the executable module, it performs symbolic relocation and resolves external references. The linker accepts object files created by the assembler as input. The linker also accepts archive or library members and output modules created previously. The objective of this development process is to produce an executable module that may be stored and executed on a device or processor.

Debugging tools are available to test processors and the linked, executable code. Application software development requires a level of simulation, observability and controllability of the software within the hardware system being developed. Tools for debugging software in a system context include simulators and emulators.

An emulator is a software development tool that allows software under development to be executed, controlled, and viewed in a real hardware environment. An emulator may be hardware, software or both. An emulator allows a user to perform software and hardware development, and to integrate the software and hardware with the target processor.

The most desirable form of emulator allows software development to occur in the real product hardware environment. To allow this form of emulation, the target processor provides an emulation interface that accesses its internal state. An emulation interface provides control and access to every memory location and register of the target processor, and extends the target processor architecture as an attached processor. The emulator can start or stop execution of the target processor program. When the target is stopped, the emulator has the capability to load, inspect, and modify all processor registers. Program data and program memory may be upgraded or downloaded.

Traditional emulation provides start and stop control of a target system, and the ability for the user to inspect the stopped system. There is an increasing need to interact with and diagnose the running system. As systems become more complex, it is difficult for a human user to monitor each system, every time it is tested. Testing occurs throughout the development and manufacturing cycle. A means of automating such interactions is desired. Such capability also has value to the product in the field. It allows configuration for a particular use, diagnosis for repair, or accumulation of operating information.

From the foregoing it may be appreciated that a need has arisen for exchanging data between processors while emulating software applications. This is provided by a new data exchange system that exchanges data between processors, is provided by a system that includes a host processor and a target processor, and is referred to as Real-Time Data exchange (RTDX™). Data is exchanged by forming a data pipeline between the target processor and the host processor. The data pipeline includes a data unit on the target processor, an emulator, and a device driver on the host processor. The data exchange system sends data through the data pipeline by transferring the data from a target memory on the target processor with the data unit to the emulator. The data exchange system transfers the data from the emulator to the first device driver. The data may be accessed by a client coupled to the host computer or a server on the host computer. The data exchange system also sends data back through the data pipeline by matching a request from the target processor to data from the host computer.

RTDX may include an enhanced emulator that allows a user to define and develop software in the environment of the target processor. The emulator reads inputs from a host PC and produces outputs to the PC as an assistant for the target processor, for the purpose of determining appropriate software and operations signals. The developer may interface additional host PC software to the emulator, to provide control and data signals to the target processor. The developer also may add software to the target processor that interacts with the emulator, for purposes of exchanging control and data information. Ultimately, when the target processors are supplied with the appropriate software resulting from the emulation operations, the target processor operates in the manner that is comparable to the rest of its system.

A more detailed description of current RTDX may be found in application Ser. No. 09/432,646 filed May 26, 2000 of Kuzemchak et al entitled "Debugger With Real-Time Data Exchange" and Ser. No. 09/738,241 filed Dec. 15, 2000 of Deao et al entitled "Data Exchange System and Method For Processors." Another is application Ser. No. 09/887,504 filed Jun. 22, 2001 of Deao et al entitled "Multiprocessor Emulation Support Using Dynamic Linking". These applications are incorporated herein by reference.

In the current RTDX when a user wants to use RTDX in their DSP application they have to embed code. They have to declare themselves channels and have to make calls into RTDX API in order to send data on those channels up to the host and receive data from the host. The steps are as illustrated in FIG. 1 where it is necessary to add RTDX calls to the target application, compile the target application, link the target application and then load the target application before the target application can be run. Then the host application has to be created or modified and the host application needs to be run. The data is then analyzed or visualized. This has to be done each time there is a change or add an RTDX setup. The target application is always compiled the first time but currently each time something goes wrong and the user wants to use RTDX to de-bug the applications the above adding calls to the target application, compiling, linking and loading the target application steps are performed. The RTDX calls would be for example RTDX_CreateOutputChannel (designating the channel) and RTDX_write (giving channel, &-data and size of data).

It is desirable to shorten the debug cycle by eliminating edit, compile and relink/reload of target application.

It may also be desirable to provide an RTDX using a non-JTAG interconnect.

SUMMARY OF INVENTION

In accordance with one embodiment of the present invention the debug cycle is shortened by eliminating edit and relink/reload of target application by dynamically inserting RTDX data transfer point in the target applications without code modifications.

In accordance with one embodiment of the present invention the user from the host can specify all the RTDX data transfer point information that is needed to be put in the target application so that RTDX data transfers occur without code modifications at the target processor.

In accordance with another embodiment of the present invention a non-JTAG interface is provided with peripheral on both the target processor and the host processor and a driver that drives the peripherals and a transport layer on both the host and the target to glue the driver to the RTDX software libraries.

BRIEF DESCRIPTION OF THE DRAWINGS

For a more complete understanding of the present invention, and the advantages thereof, reference is now made to the following descriptions taken in connection with the accompanying drawings.

DETAILED DESCRIPTION OF PREFERRED EMBODIMENTS

Figure 1:
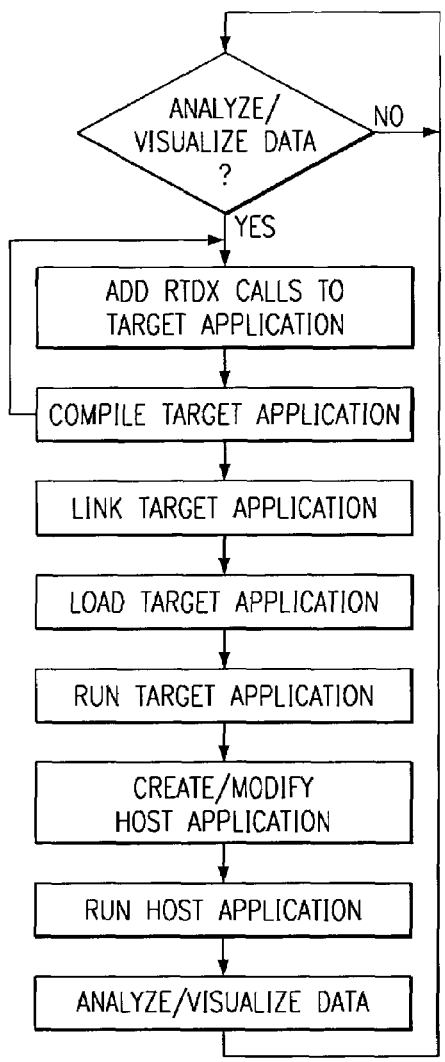
FIG. 1 is a flow diagram for adding calls to a target application according to current RTDX
Figure 2:
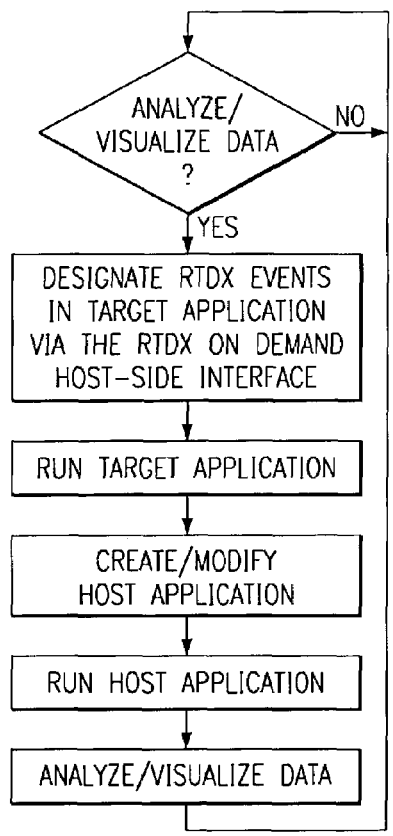
FIG. 2 is a flow diagram according to one embodiment of the present invention.

In accordance with the present invention the user does not have to touch the target DSP application once it is compiled for the first time. When it is run and the user finds something wrong and the user wants to use the RTDX to de-bug the DSP application the user does not have to touch the target application, compile it, link it and reload. As represented by the flow diagram of FIG. 2 the RTDX events are designated in the target application via the RTDX. ON Demand host side interface. On the host there is both a graphical and programmable interface that is used to specify the RTDX event information that would have to be typed in the target application using current RTDX. This information is then used under cover dynamically inserting RTDX data transfer point in the target applications. As indicated by the steps of FIG. 2 the target application is then run, the host application is modified or created and then run and the data is then analyzed and visualized.

Figure 3:
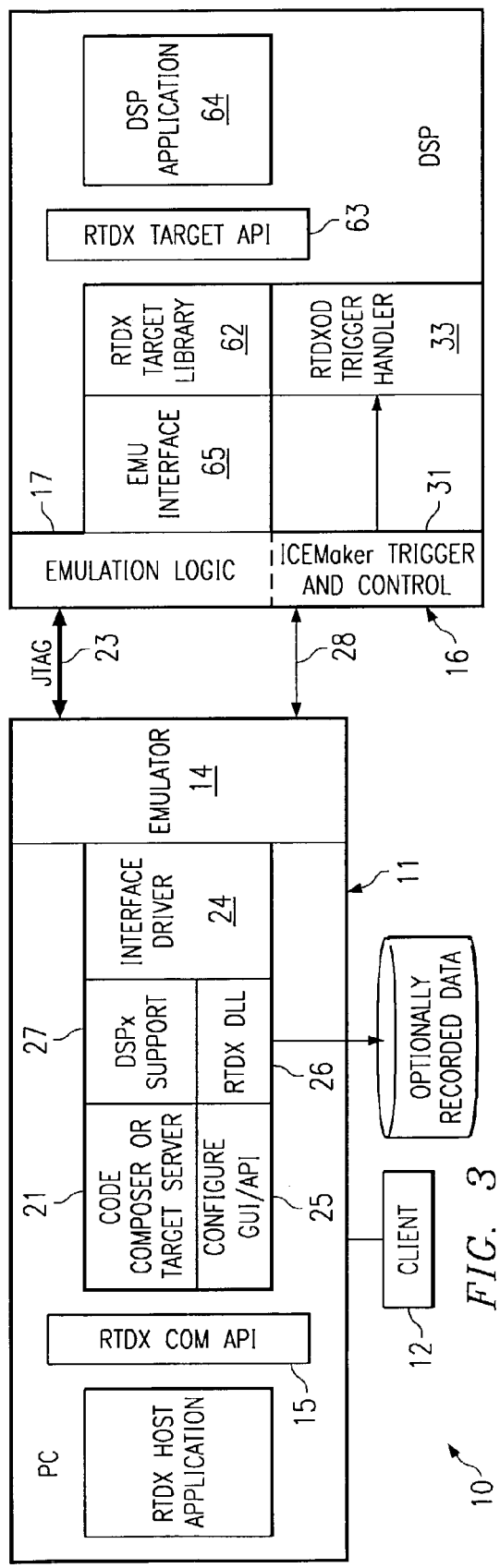
FIG. 3 illustrates a processor data exchange system in accordance with an embodiment of the present invention with RTDX On Demand using JTAG.

An embodiment of the present invention and its advantages are best understood by referring now in more detail to FIG. 3 which illustrates an on demand data exchange system with an emulator accordance with one embodiment of the present invention. The first part of the discussion is about what is in a JTAG RTDX system. For more details see the above-cited applications incorporated herein by reference.

FIG. 3 depicts a processor data exchange system 10 that monitors the emulation of a software application on a target processor in accordance with an embodiment of the present invention. Data exchange system 10 includes a host computer (PC) 11, an emulator 14, a JTAG interface 23 and a target processor 16 with emulation logic 17. RTDX enables developers to transmit and receive data between the host computer 11 and target processor without stopping their applications. Data flows from the target application 64 via RTDX API 63 through the RTDX target library 62, the emulation interface 65, emulation logic 17, JTAG interconnect to the debugger 21 running on the host computer 11. The target application 64 calls routines in the target library 62 that buffers the data and passes it on to the emulation interface 65. This, in turn, sends the data to the debugger by way of the emulation logic 17, JTAG interface 23. The debugger records the data in a log file on the host computer 11. The debugger on the host supports (functions as) COM or OLE server automation. Any host application that is a COM or OLE automation client can access data in an RTDX log file or send data to the target via the COM or OLE interface. Data flows from the COM automation client to the debugger on the client server. The debugger 21 buffers the data on the host. When the debugger 21 receives a read request from the target application, the data is sent to the emulation interface 65 on the target via the JTAG interface 23. The emulation interface passes the data to the target library 62, which then delivers it to the target application. The host computer includes RTDX DLL (Dynamic Link Library) 26 that records data from a target to a log file or buffers it internally, routes data from a target to the appropriate RTDX host application and buffers data sent from RTDX host application and sends that data to the target processor when the target processor has requested it. The DSPx support layer 27 on the host is the emulator software for the particular type of DSP. A scan based emulation interface 17 with triggers and control 31 is built into the DSP processor 16 moves the data from the DSP to the host via the JTAG interface 23.

An RTDX client 12 may be a user running applications on target processor 16 and transferring data to the target processor 16. Alternatively, RTDX client 12 may access data recorded in a log file by RTDX DLL 26. RTDX client 12 sends commands and receives information from RTDX server 21 via a development host side RTDX programming interface 15.

RTDX interface 15 is a component object model application program interface that interfaces with external RTDX clients. RTDX interface 15 provides various functions such as opening, enabling, disabling, reading, writing, seeking, rewinding, and closing channels. A channel is a stream of data defined by the user, the development system or target processor 16. RTDX server 21 may support multiple independent channels, which it multiplexes onto the single emulation interface. Each channel on the development host corresponds to a channel declared in DSP application 64 on target processor 16. RTDX server 21 receives and sends buffers of data from RTDX interface to emulator 14 via device driver 24. The data transport mechanism is also capable of recording for playback data received. RTDX server capabilities in RTDX server 21 also are available to the emulation-enabled debugger, as well as to any plug-in debugger components.

In a preferred embodiment, host device driver 24 includes an RTDX recorder/router that records the data in a log file, demultiplexes the data according to the virtual channel protocol, and then routes the data to the appropriate RTDX interface in RTDX Dynamic Link Library (RTDX DLL). Recording and routing data in host driver 24 minimizes software overheads associated with data transport The emulator 14 provides emulation-enabled debugger on host computer 11. Debugger on the server 21 performs emulation control functions using dynamically loadable target interface modules that support particular target processor 16 in use. One or more of these target interface modules may be created and uploaded, depending upon the variety of target processors in use. The DSP support modules are listed under element 27. These modules may communicate through a common embedded component module also included on computer 11. ECOM consists of software support on host computer 11 that enables target interface modules to communicate with components on emulator 14. Debugger on the server 21 enables the use of plug-in display components (GUI/API) 25. The plug-in components are used for the visualization or control of specific application features. They also may use RTDX server functionality. For example, a plug-in is provided to graph the data received on a particular RTDX channel. The software RTDX Dynamic Link Library (RTDX DLL) is represented by element 26.

Emulator 14 includes hardware and software components. Hardware components include a processor and interfaces and emulation interconnects. Software components include drivers for hardware interfaces, target processor interface modules, target data transfer control software, or data pump, and ECOM support software.

The hardware interconnect between emulator 14 and target processor 16 is an enhanced emulation interface containing both traditional JTAG emulation control signals transmitted on interconnect 23, as described in IEEE standard 1149.1, and configurable signals for the transmission of real-time data on interconnect 28. The use of dual-purpose interconnects 23 and 28 minimizes the number of signals being exported by target processor 16 while maintaining the control capability expected of current emulators. The ability to configure signals in this interface for real-time data exchange allows maximum data transfer rates between the emulator 14 and target processor 16, while minimizing the total number of signals required. The entire interconnect may be sent through the JTAG interconnect 23 alone.

Emulation control functionality is supported by individual target interface software modules 27 tailored to the specific target processor 16 in use. Control functions are relayed from development target interface module via the ECOM support modules to emulator target interface software module. Preferably, a plurality of target modules is uploaded. These modules control target processor 16 using the enhanced JTAG link 23 via JTAG interface driver 24 on the emulator 14. JTAG interface driver 24 and associated interface hardware provide for continuous uninterrupted transfer of data across JTAG data interconnect 23.

Emulator 14 may support multiple kinds of target processors 16, and combinations of different target processors at the same time. For each kind of target processor 16, a target interface software module is dynamically loaded into emulator 14. The DSPx modules 27 on the host and emulator supply the dynamic loading capability. Each target interface module on host computer requests by name its corresponding emulator-side module. This capability allows support for target processors to be developed separately, and combined as required for a particular user.

Real-time data exchange is supported by data moving to or from host computer 11 via device driver 24. Device driver routes data received from host computer to the appropriate emulation software: ECOM, target data transfer control software, or RTDX driver/memory. Driver 24 transfers data coming from DSPx 27, control software, or RTDX driver/memory to host computer 11. This data may contain results of target processor 16 software functions or the contents within registers on target processor 16. The direct routing of data on emulator 14 allows it to maintain high data rates across multiple sources and destinations by minimizing software overheads. Emulator 14 contains a substantial amount of memory used by device driver to buffer the RTDX data en route between the target processor 16 and RTDX client 12. Emulator 14 supports real-time data transfer across the data signals of JTAG interconnect 156. When used in this mode, control software interacts with JTAG interface driver 24 on the emulator 14 to move data between emulator 14 and target processor 16 via the emulation logic 17.

Emulator 14 also is capable of configuring signals in enhanced emulation interconnect for use with high-performance RTDX. In this mode, data is transferred at an increased rate by a hardware peripheral using RTDX driver/memory. Driver for the HS-RTDX peripheral directs data received from target processor 16 directly to interface driver 24. This direct connection maintains low software overhead in emulator 14 and allows it to maintain high data rates on multiple interfaces. Interface driver 24 also directs data received from host interface directly to RTDX driver/memory, where it is transferred via interconnect 28 with direct memory access to RTDX data unit at the DSP processor 16. The ability to reconfigure pins for RTDX data transfer minimizes the target processor hardware connection cost.

Either the RTDX, or data pipeline, path or JTAG path enables buffers of data be transferred from RTDX client via drivers and emulation logic 17 to target processor 16.

Target processor 16 is coupled to emulator 14 via emulator logic 17, enhanced JTAG emulation interconnect 28 and RTDX interconnect 23. These interconnects and the emulator logic contain both the signals needed for JTAG on interconnect 23 and additional signals that may be configured for higher performance data transfer on RTDX interconnect 28. Preferably, target processor 16 is an embedded processor, and, more preferably, a digital signal processor.

Application 64 communicates using RTDX via RTDX target library's programmable interface 63. The RTDX library 62 supplies a standard interface that is independent of target processor 16 or the particular emulation interface used such as JTAG RTDX or RTDX. RTDX interface library 62 enables application 64 to declare independent streams of data called channels. Preferably, these channels are virtual channels in that they are not hard wired. Each channel appears to application 64 and RTDX client 12 as an independent stream of data. The RTDX system manages the transport of this data over the shared emulation interconnects 28 and JTAG interconnect 23. Application 64 may send or receive data independently on these channels. Both blocking and non-blocking functions are available to receive data. RTDX interface library 62 also supplies functions to enable, disable, and check the status of these channels. The ability to have independent data streams via a standard interface enables application software to be written in a modular form, without regard to the particular combination of modules in use at the moment. It also enables DSP application 64 using such modules to be reconfigured easily to use either JTAG or RTDX hardware on a variety of target processors.

RTDX library interface 63 interfaces to JTAG emulation interconnect 23 or RTDX emulation hardware data unit to transfer data to emulator 14. In the latter case, RTDX data unit is a dedicated hardware unit inside target processor 16 that supplies high-performance real-time data exchange. It provides direct memory access for data movement and a simple software interface that minimizes the size and intrusiveness of RTDX library 62. The hardware emulation support within target processor 16 enables RTDX data unit to be activated, or triggered, by conditions detected within target processor 16. The desired conditions may be configured using JTAG emulation interconnect 23 via target interface modules 27 on the host 11.

RTDX target library 62 provides for instantaneous capture of data on target processor 16. Instantaneous capture is necessary when real-time data transfer is triggered by conditions configured by the debugger via JTAG target interfaces 17 and 31. In such usage, the data to be captured may exist only at the time of the trigger detection. This specific usage requires that the data be copied instantaneously when the trigger happens. For this purpose, RTDX target library 62 copies the data into an internal buffer. The captured data is then transmitted to the host client as fast as the configured emulation interconnects 23 and 28 permit.

DSP application 64 may request data from RTDX client via RTDX library interface 63. Multiple requests may be pending at any given time. RTDX library 62 encapsulates such requests as a message to RTDX DLL 26. RTDX DLL 26 then responds with data from RTDX client as it becomes available. This implementation moves data to DSP application 64 via the RTDX data pipeline when requested, thereby minimizing the buffer space required in the target processor 16.

The method for sending data from target processor 16 to RTDX client on a data pipeline is provided by the application 64 calling RTDX library 62 to send data; RTDX library 62 identifies the target memory on target processor 16 that stores the data to be sent. The target memory may be a register on target processor 16 or cache memory storing results from executing application 64. RTDX library 62 utilizing RTDX data unit transmits data across interconnect 28 to RTDX driver/memory in the emulator 14. RTDX data unit copies the data within the target memory identified in the previous step to the emulation interface. RTDX data unit takes the data directly out of the target memory as application 64 is running on target processor 16. The data is received into RTDX driver/memory on emulator 14. RTDX driver/memory places the data into memory using direct memory access. The device driver transfers or copies the sent data. The host device driver 24 transfers or copies the sent data from memory on emulator 14. After the data has been transferred to device drivers the data is placed into memory in the RTDX DLL 26 on host computer 11. The data may be placed into RTDX server 21 and is placed into RTDX client 12.

The method for sending data from RTDX client to application 64 on target processor 16 begins by application 64 on target processor 16 calling RTDX library 62 to request data on a particular channel created by application 64 or host computer 11. Next step is executed by RTDX library 62 encoding the data request in the form of a data packet to be sent through the data pipeline. The next step is executed by RTDX data unit transferring the data packet to RTDX DLL 26 on host computer 11. The next step is executed by RTDX client 12 sending the data, via RTDX server 21, to same channel identified. The next step is executed by RTDX DLL 26 matching the data request from application 64 to the data sent from RTDX client 12. If no request is available for the data sent, the data is held until a request arrives at RTDX DLL 26. After the request arrives, the next step is executed by host device driver 24 transferring, or copying, the requested data sent from RTDX client to emulator memory. Preferably, the data is sent to RTDX driver/memory. Also there is executed by device driver the transferring of the requested data to the emulator memory or, RTDX driver/memory. RTDX driver/unit on emulator 14 transfers, or copies, the data across the emulation interface, including interconnect to RTDX data unit. The next step is executed by RTDX data unit placing the requested data into a target memory on target processor 16 as identified by application 64. The next step executes by completing the method for sending data requested by application 64 on target processor 16.

Figure 4:
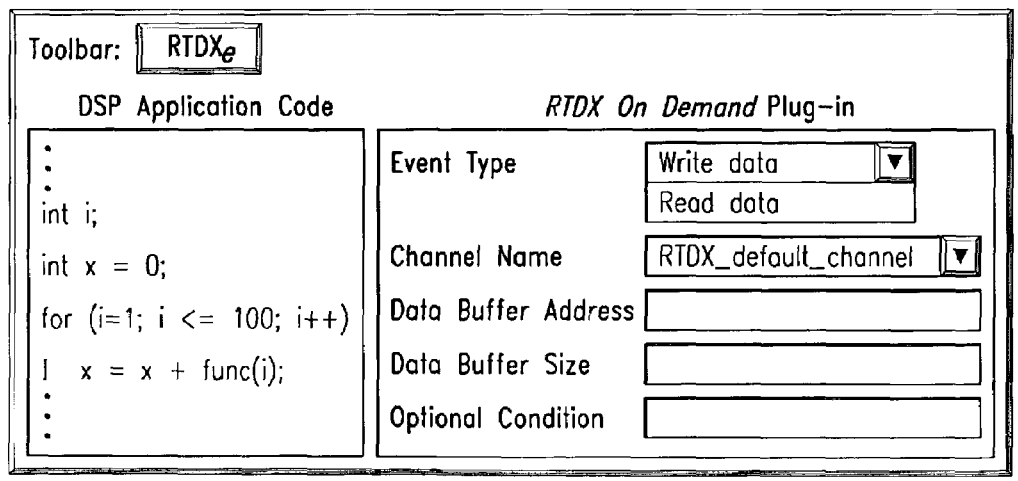
FIG. 4 illustrates the mock up of a plug-in display for entering RTDX ON DEMAND.

In accordance with one embodiment of the present invention an RTDX On Demand capability is provided in connection with the debugger code. The debugger application brings up plug-ins via GUI/API 25 like that illustrated in the mock up display in FIG. 4 for entering in the event information. The user brings up a view of the application code just as the user would do in the debugger to debug anything else. The user selects where in the program source code the user would like an RTDX action to occur in the program. In the example in FIG. 4, let's assume that the user wants to send value of X to host after the program executes the statement x=x+func (i). The host debugger 21 may present the user a plug-in as illustrated in FIG. 4 where the event type may be selected by a plug-in with a pull down such as to select write data or read data. The user may place a cursor on the line of interest, and then push the new RTDX event button on the debugger's toolbar or right click and select a pull-down menu option. This action brings up the RTDX On Demand Plug-in. The event is then selected. The channel is then selected which may be a selection by a pull down. The data buffer address and data buffer size may then be selected or otherwise entered. (In the prior art RTDX cited above, one would have entered all of this information directly in the code, such as RTDX_write (& Channel, & x, size(x)), where & represents an address.) There can also be an optional condition such as "only if X=0" to select a narrow range. Various of these actions may be automated by the debugger when sufficient program debug information is available.

The DSP 16 includes programmable advanced event triggers and controls (AET) 31 as part of an emulation capability. The triggers are a set of programmable comparators that enable the user to set transfer points that are active all the time monitoring for events while the application executes. The triggers are programmed by the JTAG scan interface 17 of the DSP processor 16. Such an event (arrival at the statement x=x+func(i)) is illustrated in FIG. 4 and that event is designated by the user at the host 11 via client 12. The JTAG scan programs the triggers 31 from the host 11 via the emulator 14 and the emulation logic 17. When the trigger comparator senses a match (in the illustrated example, the match of the program counter to the address of the designated statement), an interrupt is generated that traps (gives control) to the RTDX On Demand (RTDXOD) handler 33, and it calls the appropriate RTDX routine such as RTDX_write (or RTDX_read) to do the data transfer on the channel specified using the data specified (&x) with the size information (size (x)) and the condition specified. The handler 33 makes a call to the RTDX Target Library 62 and passes that parameter information that it has up to an RTDX write (or RTDX_Read) and the call is made. The RTDXOD handler 33 takes the parameters that were specified up on the host and stored in the RTDXOD handler 33 itself and makes the call to the RTDX Target Library 62. The program information is sent down to the triggering 31 at the hardware comparator and is stored at the target Library 62. The information is sent through the emulator via the JTAG 23 and 28.

In an alternate implementation, a breakpoint instruction is placed at the designated statement (x=x+func(i) in the example of FIG. 4). The triggering hardware 31 is set to direct this breakpoint as a trap to the RTDXOD handler 33. When the breakpoint instruction is executed, the transfer of the data proceeds as described above.

The RTDXOD handler 33 may further refine the trigger conditions detected by the triggering hardware 31. This refinement is accomplished by taking the trap generated by the triggering hardware 31 and evaluating additional conditions programmed into the RTDXOD handler 33 by the RTDX On Demand Plug-In via the debugger 21. If the additional conditions are evaluated to true, the data transfer action occurs as specified above. If the additional conditions are not true, the RTDXOD handler 33 returns from the trap without any action.

The RTDXOD handler 33 is capable of invoking additional actions besides RTDX transfer operations. The RTDXOD handler may invoke any system or user code embedded in the RTDX library 62 or the DSP application 64. This capability may be used for providing a real-time remote procedure call capability on demand.

In an alternate embodiment, some very simple trigger conditions may be activated directly by the triggering hardware 31. In this embodiment, the triggering hardware detects the pre-programmed condition and directly signals the emulation logic 17 to begin a data transfer, without the necessity of generating a trap to the RTDXOD handler 33. This particular embodiment can only be used for simple trigger conditions and RTDX actions that can be expressed entirely by the program state of the emulation and triggering hardware 17 and 31.

Figure 5:
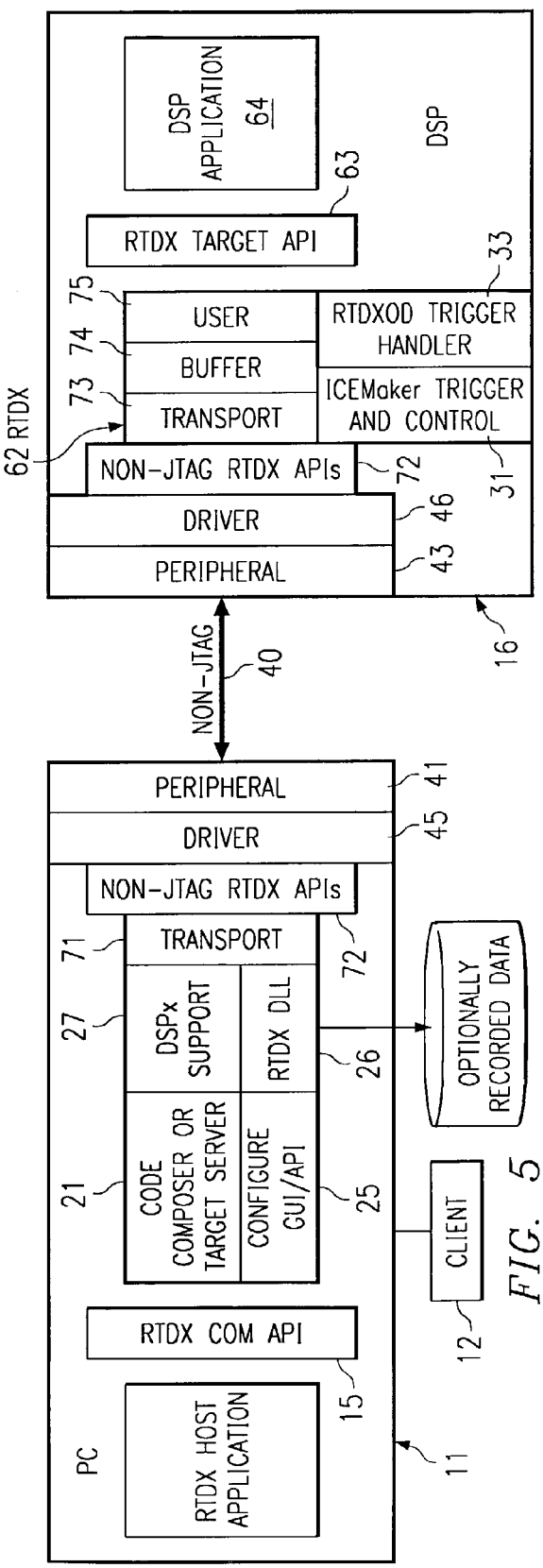
FIG. 5 illustrates the architecture of an RTDX On Demand system using non-JTAG RTDX.

RTDX On Demand may also be sent via non-JTAG RTDX as illustrated by FIG. 5. The non-JTAG link 40 may for example be Eithernet, USB, Firewire, serial ports, parallel ports. The emulator 14 and the emulator logic 17 on the chip are replaced by the peripheral 41 on the host PC 11 and the peripheral 43 on the target DSP 16. On top of the peripherals are their software drivers 45 and 46. For the host PC 11, many of these drivers 45 such as for Ethernet, USB, etc. can be provided by the vendor of the PC 11. These drivers drive the corresponding hardware peripherals. The software on the PC 11 includes the RTDX Dynamic Link Library (RTDX DLL) 26 and transport layer 71 with the non-JTAG RTDX API 72 between the driver 45 and the peripheral 41. The drivers 45 and 46 hook up to the RTDX software through the non-JTAG RTDX APIs 72. At the DSP 16 the RTDX software includes the transport layer 73, the buffer 74, the user interface 75 and the RTDX On Demand (RTDXOD) trigger handler 33. The transport layer 73, buffer 74 and user interface 75 are in the RTDX Target Library 62. The transport layer is a very thin layer of code that exports the non-JTAG RTDX API 72. The interfaces contained therein are very typical APIs for device driver software such as read, write, open, close and I/O controls. A small amount of glue code enables the driver 46 to hook up to the transport API 72. Likewise there is an implementation of API 72 between the transport layer 71 on the PC 11 and the PC driver 45 to enable the transport parameters to match the driver parameters on the host PC 11.

The same triggers and control 31 are put on the target processor 16 as in the case of the emulator. The only difference between this and the JTAG RTDX On Demand is that the triggers are programmed via the transport layer. The program data has to flow down the non-JTAG path with the peripherals and the drivers and it is the RTDX Library on the target DSP processor 16 and the transport layer that is going to be able to write to the triggers (trigger registers for the comparators). The condition and action information in the RTDXOD trigger handler 33 is programmed in the same fashion. When the triggers fire, the RTDXOD trigger handler 33 services the interrupt, and calls the appropriate RTDX routine (RTDX_write or RTDX_read) in the RTDX Target Library 62 to do the data transfer, as already described for the JTAG case. The condition refinement and remote procedure call capabilities described for the RTDXOD trigger handler 33 in the JTAG case are applicable to the non-JTAG case unchanged.

Figure 6:
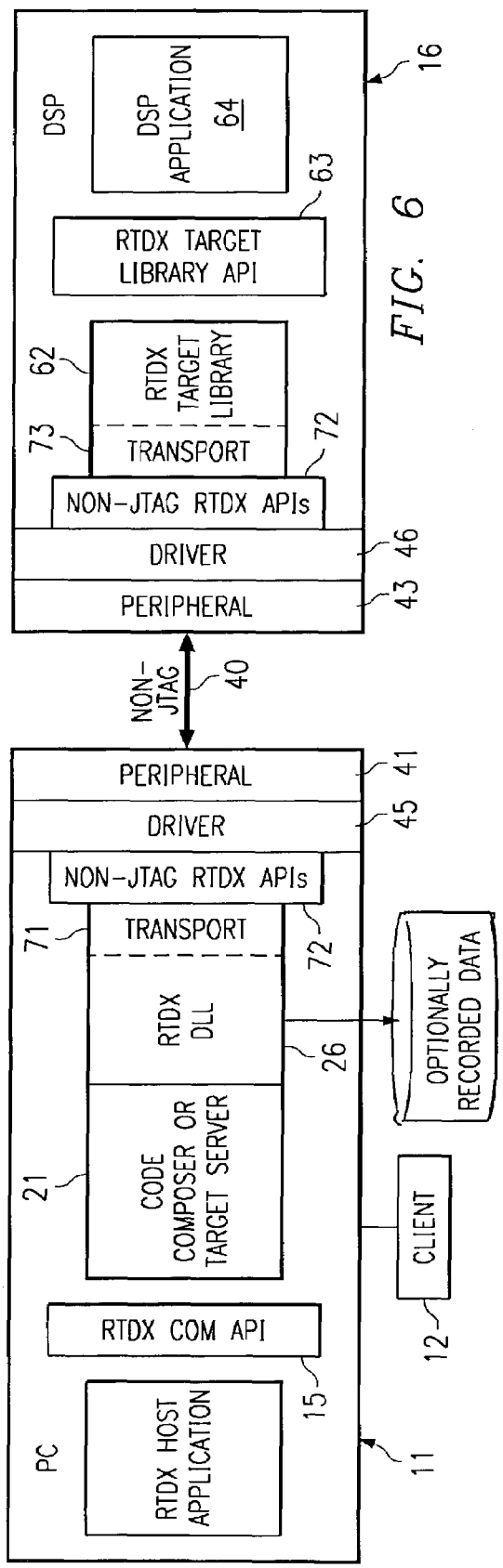
FIG. 6 illustrates the architecture of a non-JTAG RTDX system.

This non-JTAG on demand embodiment illustrated in FIG. 5 teaches how a non-JTAG RTDX data link is provided. A non-JTAG RTDX data link is illustrated in FIG. 6 with a host PC processor 11 and a target processor 16 and the non-JTAG interface 40. The host PC processor 11 includes an RTDX host application, an RTDX communication API 15, a target server 21, and the software including the RTDX DLL 26. The target DSP 16 includes the DSP application 64 and the RTDX target library 62 with a RTDX target library API 63 between the DSP application 64 and the RTDX Library 62. In the non-JTAG RTDX, the data transfer is occurring over a link 40 as described previously such as Ethernet, USB, Firewire, etc. The peripheral 41 is on both the host PC 11 side and the peripheral 43 is on the target DSP 16 side. On top of peripheral 41 is the driver 45 and on peripheral 43 is driver 46. Transport layers 71 and 73 are provided in the RTDX software on both the host PC and the target DSP to glue the drivers to the RTDX software libraries. There is included with the transport layer the implementation of API that provides adaptation of the driver parameters to the RTDX transport layer parameters as described in connection with the non-JTAG RTDX On Demand.

Figure 7:
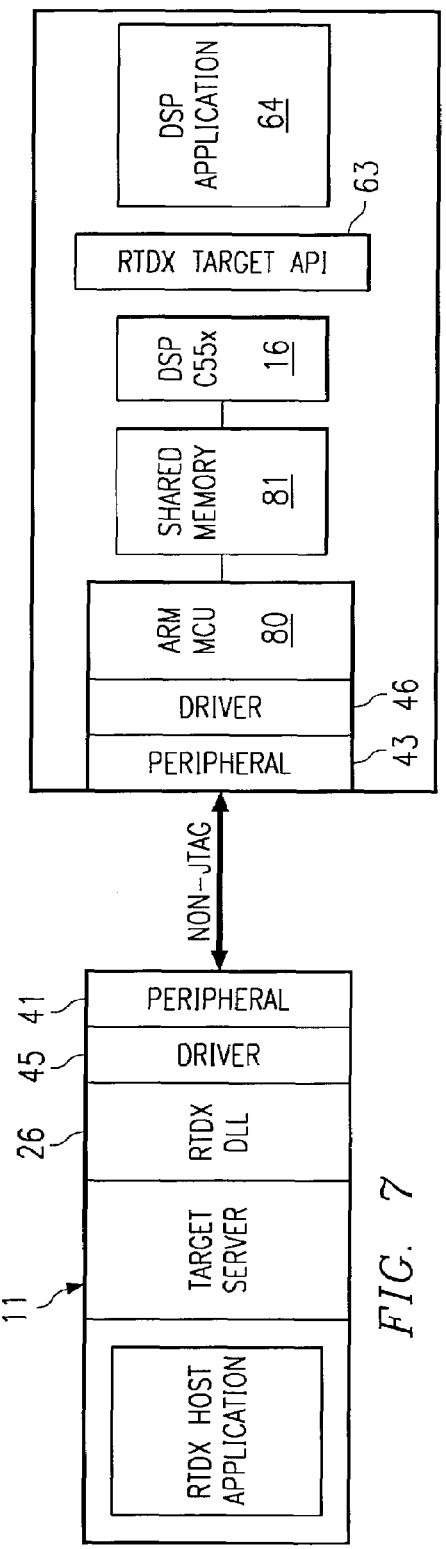
FIG. 7 illustrates a non-JTAG RTDX system with an intermediate node.

FIG. 7 illustrates the non-JTAG RTDX with an intermediate node 80 such as an ARM microcontroller between DSP 16 and the host PC 11 such as may be used in an OMAP (Open Multimedia Application Platform) device. Such a connection has a shared memory 81 between the target DSP 16 and the microcontroller 80. The data is passed over to the ARM 80 via the shared memory. The ARM takes whatever it receives and passes it over the peripheral as discussed above to the host PC 11.

Thus, it is apparent that there has been provided, in accordance with an embodiment of the present invention, a processor data exchange system and method that satisfies the advantages set forth above. Although the present invention has been described in detail, it should be understood that various changes, substitutions, and alterations may be made herein. Other examples are readily ascertainable by one skilled in the art and may be made without departing from the spirit and scope of the present invention as defined by the following claims.

What is claimed is:

1. A real time data exchange on demand system for transferring real time data between a host processor and a target processor, comprising:

a real time target exchange library and target API library interface coupled between said real time target exchange library and a target application on said target processor;

a real time data exchange API interface coupled between a host data exchange application and a real time data exchange dynamic link library on said host processor;

an interconnection means coupled between said real time target exchange library on said target processor and said real time data exchange dynamic link library on said host processor;

means at said host processor for programming real time data exchange transfer points for data exchange in said host data exchange application into said target application on said target processor that are passed down to said target processor via said interconnection; and said target processor having programmable triggers that are programmed by said means for programming the real time data exchange transfer points in said host processor, said programmable triggers call an appropriate real time data exchange routine in said real time target exchange library to do the data transfer.

2. The system of claim 1 wherein said host processor includes a debugger for debugging said target application.

3. The system of claim 2 wherein said host processor includes an emulator and interface driver between said real time data exchange dynamic link library and said emulator and said target processor includes emulator logic and emulator logic interface between said real time target exchange library and said emulator logic and a JTAG interconnection between said emulator logic and said emulator.

4. The system of claim 1 wherein said host processor includes a first non-JTAG peripheral and first peripheral driver on said target processor; a second non-JTAG peripheral and second peripheral driver on said host processor; a non-JTAG interconnection between said first non-JTAG peripheral and said second non-JTAG peripheral; a first transport layer on the host processor to glue the second peripheral driver to the real time data exchange dynamic link library; and a second transport layer in the target processor to glue the first peripheral driver to the real time data target exchange library.

5. The system of claim 1 including a graphical user interface and API for programming said real time data exchange transfer points on said target processor from said host computer.

6. The system of claim 5 wherein said graphical user interface includes pull down menus and displaying code and means for entering transfer events with channels, data addresses and data sizes for transfer, and optional conditions.

7. The system of claim 1 wherein said target processor includes a trigger handler operative with said programmable triggers to fire the handler services and cause an interrupt and calls the appropriate real time data exchange routine.

* * * * *